United States Patent [19]

Bruner et al.

[11] Patent Number: 4,535,015

[45] Date of Patent: Aug. 13, 1985

[54] WEFT INSERTED WARP KNIT CONSTRUCTION

[75] Inventors: Jeffrey W. Bruner, Greensboro; Delbert A. Davis, Kernersville; Jack Leach, Greensboro, all of N.C.

[73] Assignee: Burlington Industries, Inc., Greensboro, N.C.

[21] Appl. No.: 585,860

[22] Filed: Mar. 2, 1984

[51] Int. Cl.³ ............................................. B32B 3/00
[52] U.S. Cl. .................................. 428/44; 156/304.1; 156/304.4; 156/304.6; 156/304.7; 428/52; 428/53; 428/54; 428/58; 428/61; 428/101
[58] Field of Search ..................... 428/61, 44, 52, 53, 428/54, 58, 121, 124, 126, 102; 156/73.1, 272, 273, 304.1, 304.4, 304.6, 304.7

[56] References Cited

U.S. PATENT DOCUMENTS

| | | | |
|---|---|---|---|
| 2,372,632 | 3/1945 | Webb | 428/61 |
| 3,279,221 | 10/1966 | Gliksmann . | |
| 3,573,151 | 3/1971 | Dawbarn . | |
| 3,700,536 | 10/1972 | Bentvelzen et al. . | |
| 4,026,129 | 5/1977 | Sternlieb . | |
| 4,181,514 | 1/1980 | Leftkowitz et al. . | |
| 4,183,993 | 1/1980 | Benstead et al. . | |
| 4,211,807 | 7/1980 | Yazawa et al. . | |
| 4,298,645 | 11/1981 | Obayashi et al. . | |
| 4,301,204 | 11/1981 | McCusker et al. . | |
| 4,303,712 | 12/1981 | Woodroof | 428/61 |
| 4,320,160 | 3/1982 | Nishimura et al. . | |
| 4,472,086 | 9/1984 | Leach | 405/258 |

Primary Examiner—Marion E. McCamish
Attorney, Agent, or Firm—Cushman, Darby & Cushman

[57] ABSTRACT

A large water and air impervious textile panel suitable for use as a pond liner, tarpaulin, or the like, is constructed from a plurality of smaller panels. Each small panel comprises a weft inserted warp knit fabric having reinforcing substrate strips disposed at the selvedge edges thereof, and the strips spaced from each other along the width of the fabric. The small panels are chemically finished by first applying an adhesive system such as an isocyanate, and then a thermoset or thermoplastic polymer coating. The selvedge edges are prepared for attachment to each other by buffing and then applying an adhesive cement. The buffing does not extend along the width of each small panel any further than the width of the selvedge reinforcing substrate strip. Adjacent selvedge edges of the small panels are overlapped, and then attached to each other with the cement adhesive. Alternatively the overlapped small panel edges may be ultrasonically or thermally bonded to each other. The selvedge reinforcing substrate strips provide, irrespective of the manner of attachment of the small panels together, a greater resistance to tear, and longer life, for the large textile panel produced. Also such strips facilitate the chemical finishing of the small panels.

23 Claims, 5 Drawing Figures

WEFT INSERTED WARP KNIT CONSTRUCTION

BACKGROUND AND SUMMARY OF THE INVENTION

Conventional weft inserted warp knit fabrics have many desirable properties, and desirable production procedures, so that the use thereof for large textile panels, particularly water and air impervious large textile panels such as pond liners, roof reinforcements, tarpaulins, and air supported panels, is desirable. However there have been practical difficulties associated with the formation of weft inserted warp knit fabric into large textile panels. These difficulties primarily occur because there is insufficient cohesion between the yarn systems to provide the necessary seam strength when widths of the fabric are attached to each other. Even after improving the adhesive properties of the fabric by chemical finishing, and coating, sufficient seam strength cannot be achieved for many applications. For instance when it is desired to attach such fabric structures together by buffing the selvedge edges and then utilizing a cement adhesive, the buffing destroys the polymer coating and portions of the fiber bundle, leading to reduced strength and service life. Heat sealing the lapped seam area accelerates the aging process of the polymer by oxidation, and the fibers of the fabric are degraded by the same process. Ultrasonically fusing the lapped areas to form a seam degrades the polymers in a manner similar to heat sealing, with the associated reduced tearing strength and service life.

According to the present invention, the problems inherent in the utilization of weft inserted warp knit fabrics in the construction of large textile panels—as set forth above—are substantially overcome, and large textile panels may be produced that have good seam strength and tear resistance, and long service life. Large textile panels according to the invention are suitable as pond liners, roof reinforcements, tarpaulins, air supported panels, or for other uses where air and water impervious large textile panels are desired.

The basic feature according to the present invention that allows the disadvantages of the prior art to be overcome is the provision of a tough reinforcing substrate along the selvedge edges of the small weft inserted warp knit fabric panels that are produced (and subsequently joined to form large panels). The substrate strips are spaced from each other along the width of the fabric, but extend a sufficient distance along the selvedge edges to provide the desired reinforcement during joining of the edges together, whether by buffing and subsequent application of cement adhesive, or ultrasonic or thermal fusing. The substrate strips are stitched to the weft inserted warp knit fabric during the normal construction thereof, and for some uses may also be provided at intermediate portions along the width of the fabric, parallel to the selvedge edge strips and spaced therefrom. Typical substrate materials utilizable in the practice of the invention include nonwoven fabrics, paper, thermoplastic films, knit, or woven fabrics, as long as they have the necessary toughness to perform the reinforcing function.

In addition to overcoming the drawbacks in the prior art, as discussed above, by the practice of the present invention chemical finishing of the textile panels is facilitated. The fabric of the small textile panels may be securely clamped at each selvedge by the pins or clips of a tenter frame during chemical finishing. Typically finishing would be accomplished by applying an adhesive system, such as an isocyanate, Resorcinol formaldehyde, or Silane, and then applying a thermoset or thermoplastic polymer coating over the adhesive system.

According to the invention, the adjacent selvedge edges of small panels are overlapped, and then attached to each other to form a final large textile panel. The overlapping edges may be cascaded to facilitate buffing and cement application, and then underlying edges turned back to provide attachment to the associated adjacent edges.

It is the primary object of the present invention to provide large textile panels formed from smaller panels of weft inserted warp knit fabric—and a method of production thereof—that have good seam strength, good tear resistance, and long service life. This and other objects of the invention will become clear from an inspection of the detailed description of the invention, and from the appended claims.

DETAILED DESCRIPTION OF THE DRAWINGS

Figure 1:
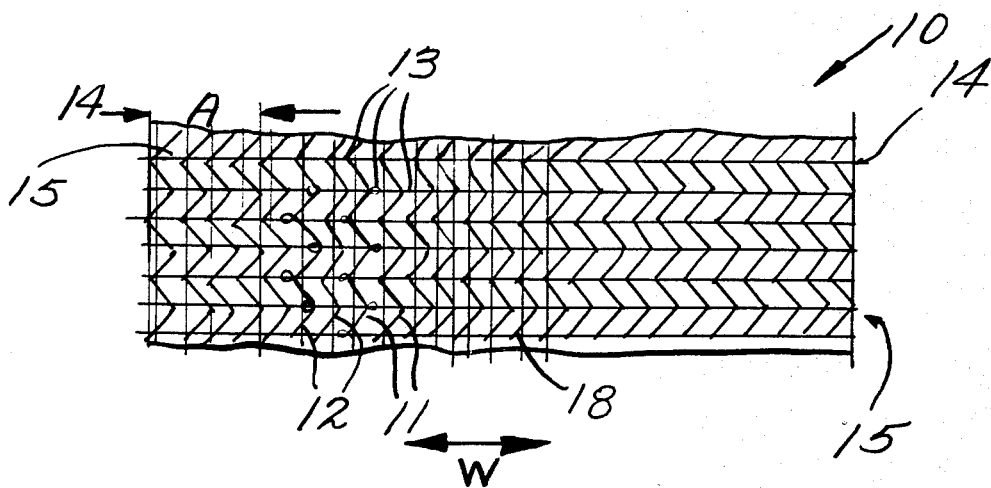
FIG. 1 is a top schematic view of a length of a small panel of weft inserted warp knit fabric utilized according to the present invention.

The first step in the practice of a method according to the present invention is to form a weft inserted warp knit fabric utilizing any suitable conventional machine, such as a Liba, Mayer, or the like. Typical weft inserted warp knit fabric is shown in U.S. Pat. No. 4,298,645. A section of a weft inserted warp knit fabric according to the present invention is shown generally by reference numeral 10 in FIG. 1, and it includes knitting (and stitch forming) yarn 11, lain-in warp yarn 12, and laid-in weft yarn 13. Selvedge edges 14 are provided in the machine direction M. For purposes of the present invention, the yarn 11 is preferably a continuous filament yarn, such as nylon, polyester or like textile fiber. The laid-in warp and weft yarns 12, 13, preferably also are continuous filament yarns, such as nylon, polyester, aramid, fiberglass, or like textile fibers.

In the practice of the present invention, at the selvedge edges 14 of the fabric 10, reinforcing substrate strips 15 are provided. These strips extend a predetermined distance A in the width dimension W of the fabric 10, and the strips 15 are spaced from each other along the width dimension W, as clearly illustrated in FIG. 1. The substrate strips 15 are laid-in in a conventional manner in the conventional Liba or Mayer machines, in much the same way that continuous substrate strips are laid-in in the production of backed weft inserted warp knit fabrics (such as shown in U.S. Pat. No. 3,279,221). The distance A is only as great as is necessary in order to provide adequate reinforcement at the seams of the final large textile panel 17 (see FIG. 5) to be produced.

Any tough sheet material may be used for the substrate strips 15, preferred materials including nonwoven fabrics, paper, thermoplastic films, knit fabric, and woven fabric. The substrate strips 15 are stitch bonded by the knitting/stitching yarns 11 to the warp and weft threads 12, 13, during production of the fabric 10.

For some applications, it is desirable to provide one or more additional strips along the width of the fabric 10. Such an additional strip is illustrated by reference numeral 18 in FIG. 1, the strip 18 extending parallel to the selvedge strips 15, and spaced therefrom in the width dimension W. Such strips 18 are particularly desirable if the fabric 10 is to be severed in the machine direction M in order to provide a large panel having a desired width dimension.

After the formation of small panels, such as first, second, and third small panels 10a, 10b and 10c (see FIGS. 2, 3, and 5) from fabric 10 according to the invention, the small panels are chemically finished. The reinforcing strips 15 facilitate chemical finishing since they allow the fabric 10 to be securely clamped on each selvedge edge 14 by pins or clips of a tenter frame.

While the exact nature of the chemical finishing may vary, typically an adhesive system would first be applied to the fabric 10. Typical adhesive systems include isocyanates, Resorcinol formaldehyde, or Silanes. The adhesive system is usually applied directly to the fibers of the fabric 10 or in combination with an elastomeric polymer. The adhesive system can be cured immediately or held as a prepreg for the application of a final coating, the adhesive system facilitating adherence of the coating to the fabric.

A suitable coating for protecting the fibers of the fabric 10 and preferably rendering the entire panel substantially air and water impervious is applied over the adhesive system by calandering, cement coating, or lamination. Typical coatings that would be applied are thermoset or thermoplastic polymers. Typical thermoplastic polymers include hypalon, polyvinylchloride, acrylic/vinyl chloride, and urethane. Typical thermoset polymers that could be applied are hypalon, neoprene, acrylic, EPDM, urethane, or combinations of these. See coating 21 in FIG. 4.

After a chemical finishing of the small panels 10a-10c, adjacent selvedge edges 14 thereof are ultimately overlapped and affixed to each other in sealing relationship. The degree of overlap of the selvedge edges 14 is no greater than the width A of the strips 15. Attachment of the small panels together may be effected by conventional ultrasonic or thermal fusing. However it is preferred that the edges be prepared, and then attached together adhesively.

Figure 2:
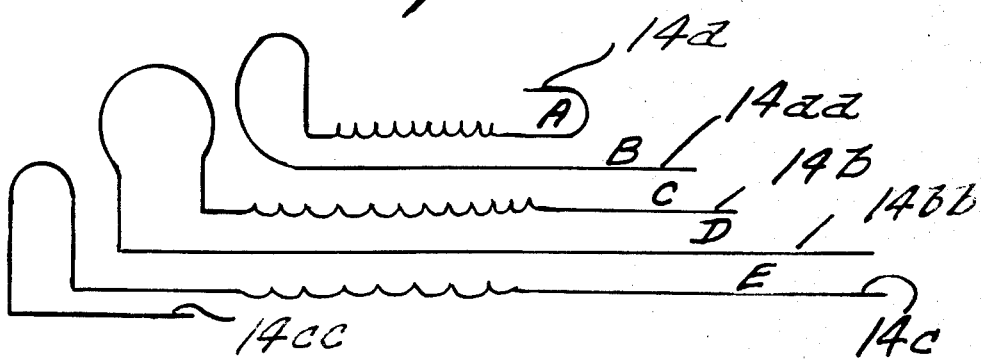
FIG. 2 is a schematic side view showing the interrelationship between three small panels (such as those of FIG. 1) that are to be connected together to form a large panel.
Figure 5:
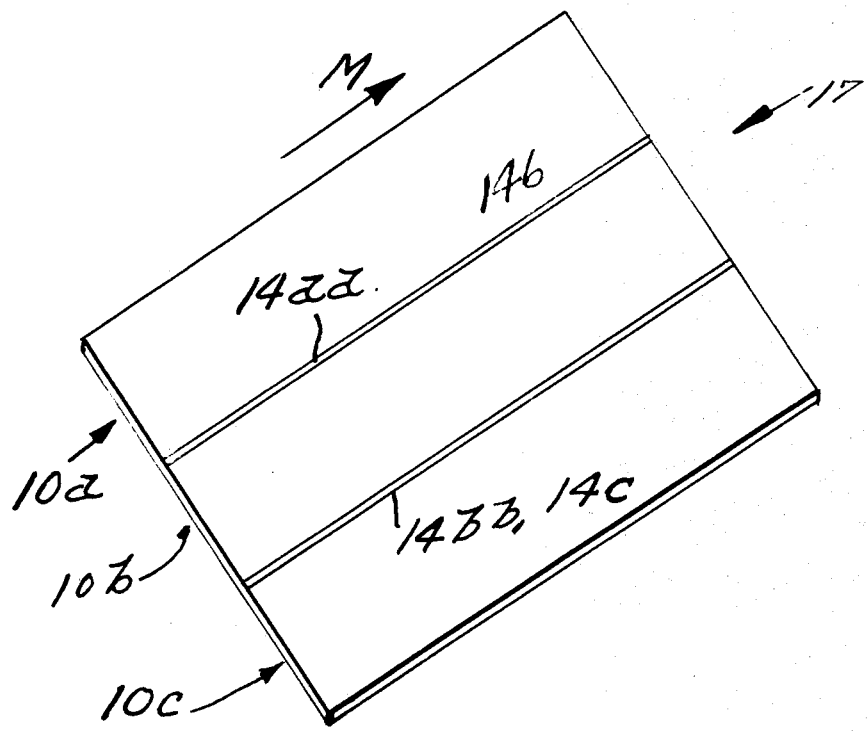
FIG. 5 is a perspective view of an exemplary large textile panel produced according to the invention.

FIG. 2 illustrates schematically a simple way to dispose the small panels 10a-10c to attach them together to form a large panel 17 (see FIG. 5). Panel 10a has first and second selvedge edges 14a, 14aa, respectively, the panel 10b has first and second edges 14b, 14bb, respectively, and the third panel 10c has first and second selvedge edges 14c, 14cc, respectively.

Figure 3:
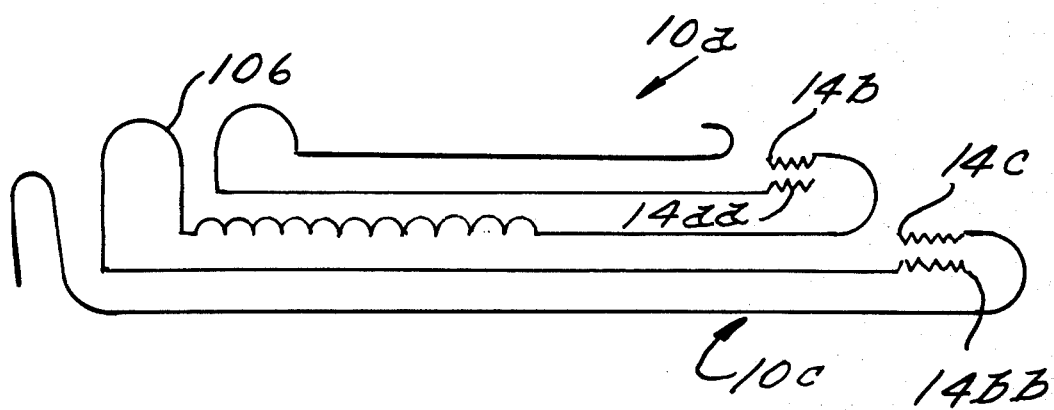
FIG. 3 is a view like FIG. 2 but showing the panels just prior to the overlapping edges thereof being joined together.

The edges 14aa, 14b, 14bb, and 14c are preferably cascaded, as illustrated in FIG. 2, to facilitate buffing thereof and adhesive cement application. The edges 14aa, 14b, 14bb, and 14c are buffed in the conventional manner, and then a suitable cement adhesive is applied thereto, while the panels assume their relative orientation illustrated in FIG. 2. After cement application, the edges 14b and 14c are turned up—as illustrated in FIG. 3—and subsequently pressed together to seal the panels 10a-10c to each other along their selvedge edges.

Figure 4:
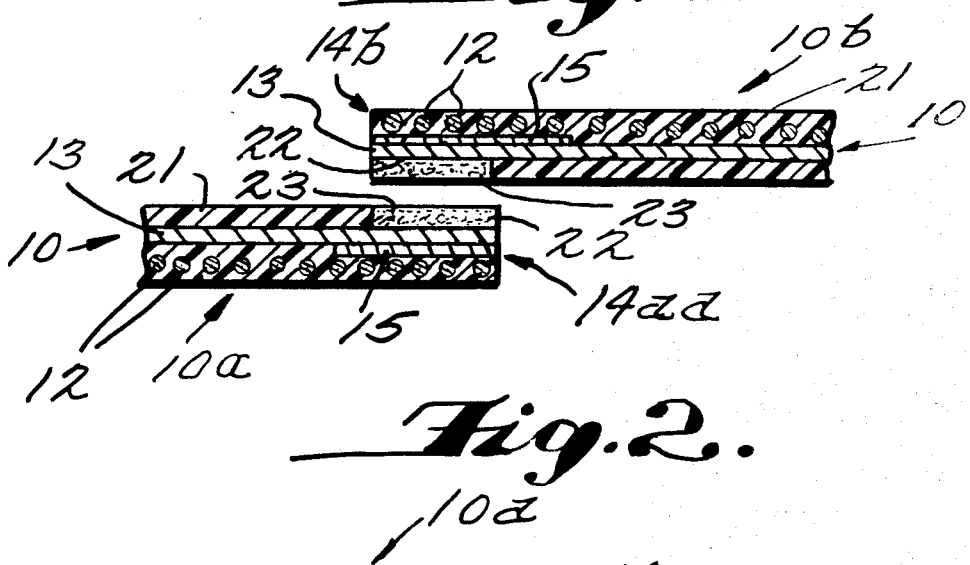
FIG. 4 is a detail cross-sectional view showing the disposition of the overlapping edges of two of the panels of FIG. 3 just prior to being joined together.

FIG. 4 is a detail cross-sectional view of typical overlapping edges of small panels just prior to being brought into contact with each other. For illustrative purposes, the edges 14b and 14aa are shown.

In FIG. 4, each of the panels 10a and 10b are shown having a fabric 10 core, with selvedge edge reinforcement strip 15, and with a polymer coating 21 encapsulating the fabric 10. A portion of the coating 21 at each of the edges 14aa and 14b—as indicated by reference numerals 22—has been removed by buffing, and a suitable adhesive cement 23 disposed in this buffed area. The portions containing cement adhesive 23 are subsequently brought into contact with each other, and the small panels 10a and 10b are thus attached to each other in sealed relationship along the selvedge edges 14aa, 14b thereof.

FIG. 5 illustrates the final large panel 17 produced according to the invention. Of course any number of small panels 10a-10c may joined together to form the final panel 17, and the small panels 10a-10c can have any desired dimension in the machine direction M. Typically, the panel 10a-10c would be about five feet wide, and could have a length up to 300 feet or more. The panel 17 is substantially air and water impervious, and may be utilized as a pond liner, roof reinforcement, tarpaulin, air supported panel, or the like.

The provision of the reinforcing substrates 15 along the selvedge edges 14 of each of the small panels 10a-10c provides, ultimately, a final large panel 17 having good seam strength, greater resistance to tearing than conventional weft inserted warp knit fabric panels, and a long service life, in addition to facilitating chemical finishing of the panels.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A large textile panel consisting essentially of:
   a plurality of small textile panels;
   each small textile panel comprising a weft inserted warp knit fabric having a reinforcing substrate strip stitched thereto along the selvedges thereof to form an integral part of the panel, said strips spaced from each other along the width of the panel, and said panel having a chemical finish thereon;
   at least one selvedge edge of each of said small panels overlapping an adjacent selvedge edge of another small panel, the overlapping of the edges not extending past the selvedge edge substrate strips of each of the panels; and
   means for holding the overlapped selvedge edges together in sealed relationship.

2. A panel as recited in claim 1 wherein the chemical finish applied to each of the small panels comprises a coating selected from the group consisting essentially of thermoset and thermoplastic polymers, and an adhesive system bridging the weft inserted warp knit fabric base and the coating to facilitate adhesion of the coating to the weft inserted warp knit fabric.

3. A panel as recited in claim 2 wherein said adjacent overlapping edges of said small panels have a buffed area extending in the width dimension a distance no greater than the width of the selvedge substrate strip associated therewith; and wherein said means for holding overlapped edges together comprises a chemical adhesive disposed at the buffed areas of said panels.

4. A large textile panel as recited in claim 3 further comprising at least one additional reinforcing substrate strip stitched to each of said small panels and extending parallel to, and spaced from, said selvedge reinforcing substrate strips of said small panel.

5. A large textile panel as recited in claim 1 wherein said reinforcing substrate strips are selected from the group consisting essentially of nonwoven fabrics, paper, thermoplastic films, knit fabrics, and woven fabrics.

6. A large textile panel as recited in claim 1 comprising three smaller panels including a central panel and two side panels, the central panel attached at both selvedge edges thereof to the side panels.

7. A large textile panel as recited in claim 1 wherein said reinforcing substrate strips are selected from the group consisting of nonwoven fabrics, paper, knit fabrics, and woven fabrics.

8. A large textile panel as recited in claim 1 wherein said reinforcing substrate strips are disposed between the warp and weft yarns of the weft inserted warp knit fabric.

9. A method of constructing a large textile panel comprising the steps of:
(a) constructing a plurality of weft inserted warp knit small panels having reinforcing substrate strips integrally incorporated therein between the warp and weft yarns and disposed at the selvedges thereof, and spaced from each other along the width thereof;
(b) chemically finishing the small panels;
(c) overlapping adjacent selvedge edges of the small panels; and
(d) attaching the overlapped adjacent edges of the small panels together to thereby form a large panel composed of a plurality of the small panels.

10. A method as recited in claim 9 comprising the further step of, between steps (b) and (c), (b1) preparing the selvedge edges of the panel for attachment to each other.

11. A method as recited in claim 10 wherein step (b1) is practiced by buffing the selvedge edges, then applying an adhesive cement to the buffed edges.

12. A method as recited in claim 11 wherein step (d) is practiced by pressing the adhesive cement of the overlapping edges into contact so that the adhesive cement holds the panels together.

13. A method as recited in claim 12 wherein step (b) is practiced by applying an adhesive system to the small panels to form a bridge between the weft inserted warp knit fabric and a coating to be applied, and subsequently applying a polymer coating to protect the fabric and prevent water and air penetration through the fabric.

14. A method as recited in claim 13 wherein step (b) is further practiced by applying a polymer coating selected from the group consisting essentially of thermoset and thermoplastic polymers.

15. A method as recited in claim 12 wherein step (c) is practiced by utilizing at least three small panels, comprising first, second, and third panels each having first and second selvedge edges; and placing the first panel second selvedge edge so that it overlies the second panel, and so that the second panel first selvedge edge is turned up from the second panel to overlap the first panel second selvedge edge; and disposing the second panel second selvedge edge so that it overlays the third panel, and turning up the third panel first selvedge edge so that it overlaps the second panel second selvedge edge.

16. A method as recited in claim 11 wherein said buffing step is practiced so that the buffed area of each panel does not extend past the reinforcing substrate of the selvedge edge which is buffed.

17. A method as recited in claim 10 consisting essentially of said steps (a)–(d) and (b1).

18. A method as recited in claim 9 wherein step (a) is practiced by further providing in each small panel at least one further reinforcing substrate strip parallel to, but spaced from, the strips disposed at the selvedges.

19. A method as recited in claim 9 wherein step (a) is practiced by further providing in each small panel at least one further reinforcing substrate strip parallel to, but spaced from, the strips disposed at the selvedges.

20. A method as recited in claim 9 wherein step (d) is practiced by ultrasonically fusing the adjacent selvedge edges of the small panels together.

21. A method of constructing a pond liner, roof reinforcement, tarpaulin, air supported panel, or like water and air impervious large textile panel, comprising the steps of:
constructing a plurality of weft inserted warp knit small panels each having reinforcing substrate strips formed integrally with the weft inserted warp knit fabric at the selvedges thereof, the strips spaced from each other along the width of the fabric;
applying a chemical coating to the small panels to render them generally water and air impervious, and protecting the fibers of the fabric, the coating encapsulating the reinforcing substrate strips as well as the weft and warp yarns;
preparing adjacent selvedge edges of the small panels to facilitate attachment thereof to another panel;
overlapping adjacent selvedge edges of the small panels; and
attaching the overlapping edges of the small panels together to thereby form a pond liner, roof reinforcement, tarpaulin, air supported panel, or like air and water impervious large textile panel.

22. A method as recited in claim 21 wherein said edge preparing step is practiced by buffing adjacent small panel edges, and applying an adhesive cement to the buffed area, the buffed area extending no further along the width of each small panel then the reinforcing substrate strip associated with that edge; and wherein said attaching step is practiced by bringing cement adhesive portions into attaching engagement with each other.

23. A method as recited in claim 21 wherein said constructing step is practiced by disposing the reinforcing substrate strips between the warp and weft yarns of the weft inserted warp knit fabric.

* * * * *